Figure 1:
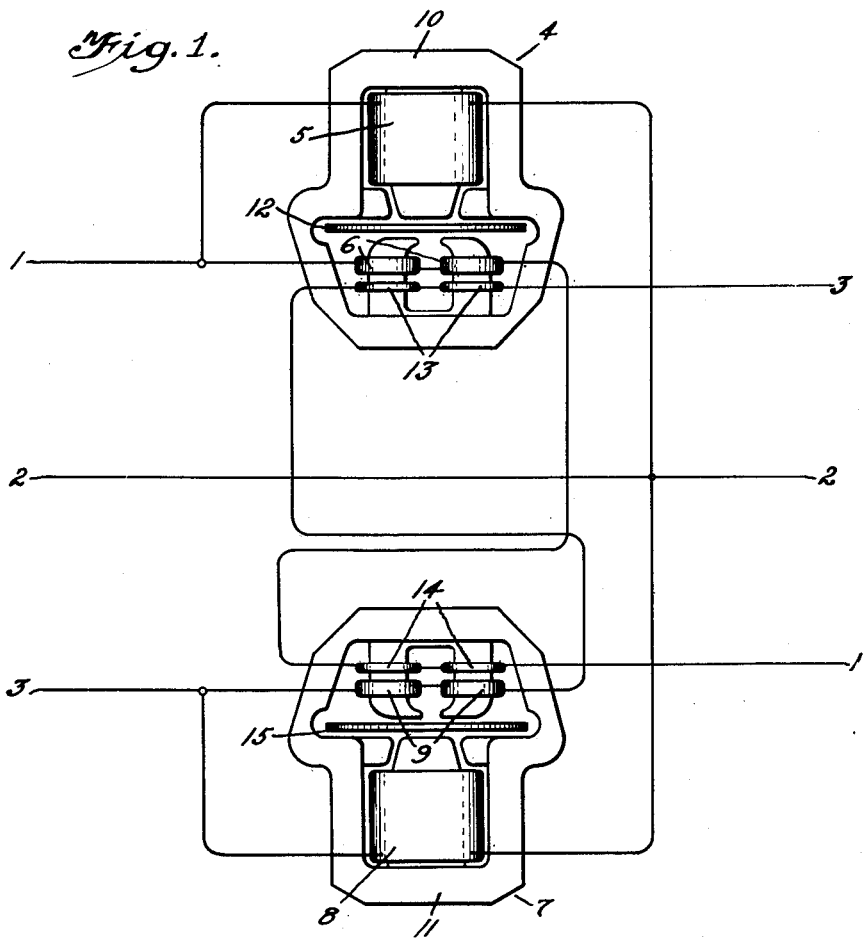

May 12, 1925.

W. H. PRATT

ELECTRICAL INSTRUMENT

Filed July 27, 1921

1,537,374

Inventor:
William H. Pratt,
by his Attorney.

Patented May 12, 1925.

1,537,374

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRICAL INSTRUMENT.

Application filed July 27, 1921. Serial No. 488,046.

*To all whom it may concern:*

Be it known that I, WILLIAM H. PRATT, a citizen of the United States, residing at Lynn, in the county of Essex, State of Massachusetts, have invented certain new and useful Improvements in Electrical Instruments, of which the following is a specification.

My invention relates to an electrical instrument, and more particularly to an instrument adapted to record the kilowatt hours consumed in a circuit having variable frequency.

The induction type of measuring instruments is being used to a considerable extent with good success for measuring alternating current power or energy. Their accuracy depends partly upon the maintenance of the proper phase relation between the fluxes which thread the rotating conducting disc. Thus, to make the meter register accurately, use is usually made of some form of lagging means for the flux produced by the potential coil, so that that part of the core surrounded by the potential coil has a flux lagging 90° behind the electromotive force impressed on the potential coil. If it were possible to design a potential coil with negligible resistance so that the power factor would be zero and the current through it purely inductive, no additional lagging device would be necessary. However, since it is impossible to build a coil with an iron core without any losses therein, due to its own resistance as well as to the eddy current and hysteresis effects in the iron, a purely inductive current cannot be obtained. It is quite customary at the present time in order to obtain the proper phase relation between the fluxes to utilize a short circuited conductor having the right resistance for the lagging means, which conductor surrounds the core of the potential coil. Such a scheme is shown for example in a patent granted to me November 6, 1906, No. 835,321; the short circuited coil is marked L in Fig. 4 of this patent. In this way it is possible to obtain a flux through the core of the potential coil which lags by exactly 90° behind the impressed electromotive force and to cause the meter to register accurately, although the losses in the potential circuit amount to a considerable value.

As has been found by experience, and as can be easily proved theoretically, a lag plate or short circuited conductor adjusted to give the proper phase relation of the fluxes will operate properly only at one definite frequency. It is impossible for such a meter to indicate the power or energy consumption accurately on a system in which the frequency varies within comparatively wide limits. Such a system is now quite common in ship propulsion systems and in such installations the frequency may vary from a few cycles up to as much as 60 cycles. The well known form of lagging is thus not suitable. I am aware that attempts have been made in the past to construct a meter to register accurately on either of two definite frequencies, as is shown by the patent to King, granted April 2, 1901, No. 671,283. Such a meter, however, cannot register accurately for intermediate values of the frequency, and it is furthermore necessary to manipulate some form of switch when changing from one frequency to another.

It is the main object of my invention to produce a meter, especially a polyphase meter, such that the phase relation of the fluxes in the core remains undisturbed and independent of wide and continuous frequency variations of the system. In my invention I do not utilize lag plates or short circuited conductors for obtaining the proper phase relation but instead use auxiliary coils somewhere on the core of the meter conductively fed from the circuit, the magnetizing effect of which is to produce the proper phase relation of the fluxes in the core.

To render the meter as accurate as possible with large frequency variations even without any flux adjusting means, I also preferably build the meter with a minimum amount of resistance in the potential circuit so as to reduce its losses. In this way the lagging means need have only a relatively small effect, and may be therefore constructed with the minimum expense. Another source of error is that introduced by the damping effect of the movable element as it cuts the flux produced by the coils. This damping effect is proportional to the speed of the disc. To make this effect as low as possible, the disc speed is reduced by using comparatively heavy damping magnets. These features, however, reduction of resistance and reduction of disc speed, are adaptations of well known principles of design so as to render the meter inherently more accurate.

Induction meters operate theoretically in such a way that they properly indicate the consumption irrespective of frequency variations, except for the errors occasioned by the losses in the potential circuit. This is due to the fact which may be analytically shown that the registering is proportional to the product of the fluxes produced by the potential and current coils and also to the frequency of the system. The product of the potential flux and the frequency, however, is proportional to the impressed electromotive force if the losses are negligible in the potential circuit. Therefore, the meter would automatically compensate for varying frequency in the relation stated above for the impressed electromotive force would be proportional to the product of the flux and frequency and the current is proportional to the flux produced by the current coil. Of course, these conditions hold only when the flux produced by the potential coil is exactly 90° behind in phase from the impressed electromotive force, or in other words, when no energy is expanded in the potential circuit. Phase compensation when effected by the use of lag plates, results in a small but appreciable loss due to the induced current in the lag plate. The losses themselves would not cause any error if they had a substantially constant ratio to the total volt-amperes with varying frequency, but this is not the case in the ordinary meter utilizing the short circuited coil or lag plate for phase compensation.

Figures 2, 3:
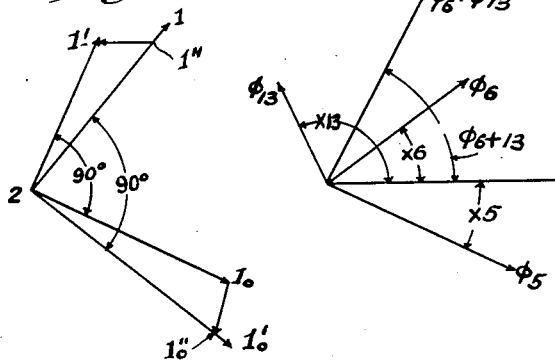

For a better understanding of my invention, reference is to be had to the accompanying drawing in which Figure 1 shows the wiring diagram for the meter and Figs. 2 and 3 illustrate the vector relations concerned in the operation of the meter.

Referring now more in detail to the drawing, I show in the present instance a three-phase circuit having mains 1, 2 and 3. This circuit is one in which the frequency varies over a considerable range, such as a ship propulsion system. For metering the energy expended in the circuit, I utilize an ordinary polyphase induction meter device having potential coils and current coils. Thus the element 4 has a potential coil 5 which is connected across mains 1 and 2, and main current coils 6 which are energized in accordance with the current flow in main 1. Likewise, meter element 7 has a potential coil 8 connected across mains 2 and 3 and main current coils 9 connected so as to be energized in accordance with the current in main 3. Cores 10 and 11 of conventional construction are provided for these meter elements 4 and 7. The rotatable elements or discs 12 and 15 are appropriately arranged to actuate a registering or indicating mechanism.

As thus far described the instrument differs in no way from an ordinary three-phase meter. However, all lag plates or short circuited conductors for correcting the phase of the flux produced by the potential coils 5 and 8 are eliminated. Instead of that arrangement I provide auxiliary current coils 13 and 14 placed upon the same limbs of the core as the main current coils but of much fewer turns. The auxiliary current coils 13 are energized from another main than that which serves to energize the main coil 6. Thus, while the coils 6 are located in main 1, the auxiliary coils 13 are in main 3 and in series with coils 9. In the same way the main coils 9 are located in mains 3 while the auxiliary coils 14 are located in main 1, in series with coils 6. It is evident that the resultant flux in the limbs of the core which carry the main and auxiliary coils has a phase which depends upon the phase relation of the currents in the two mains which energize the current coils. By suitably proportioning and connecting the auxiliary coils 13 and 14 it is possible to fix the phase relation of the fluxes in the core the proper amount so as to compensate for the fact that the potential coils 5 and 8 cannot be supplied with a purely non-inductive load. In other words, the lagging is effected by coils which are conductively supplied with energy from the system. As the frequency varies there is no variation in the phase relation of the fluxes in the cores, since the phase relations of the fluxes produced by the auxiliary current coils depend solely upon the phase relations of the currents in the mains. In a balanced polyphase system, the phase relations between the currents in the mains remain constant irrespective of any frequency variations. If lag plates had been used for lagging the fluxes threading the potential coils the amount of losses in the lag plates would vary with the frequency and would therefore cause the fluxes to have different phase relations as the frequency is varied.

In Fig. 2 let vector 2—1 represent the phase of the electromotive force which excites potential coil 5 of Fig. 1. On account of resistance and other losses, the flux induced in the core will have a phase such as would be produced by an electromotive force 2—1' acting in a circuit of zero loss. In order to produce in effect a voltage excitation in the proper phase, it is necessary to add an electromotive force which may be represented by the vector 1″—1'. Or, if there were no losses in the potential circuit, the potential flux in coil 5 would be represented by vector 2—$1'_o$. If we consider vector 2—$1'_o$ to represent potential flux multiplied by the number of turns in the current coil, in the case of a single pair of windings, with no losses in the potential circuit, we can consider vector 2—$1_o$ to represent the actual flux in coil 5 multiplied by the number of turns in coil 6, and vector $1_o$—$1''_o$ to represent the potential flux in coil 8 multiplied by the number of turns in coil 14. The effect of current coils 6 and 14 cooperating with their adjacent potential coils is to produce a torque such as would be produced by a single pair of windings where the current in the potential circuit is undisturbed by losses. A similar analysis is to be applied to the relations of current coils 9 and 13.

Denoting the fluxes in each coil by $\varphi n$ and their phase angles by $Xn$ where $n$ is the number of a particular coil in Fig. 1, the following relations hold:

Torque of top element $$= K[\varphi_5 \varphi_6 \sin(X_6 - X_5) + \varphi_5 \varphi_{13} \sin(X_{13} - X_5)]$$

Vectorially $$K = [\varphi_5 (\varphi_6 + \varphi_{13}) \sin(X_{6+13} - X_5)]$$

Similarly the torque of the lower element $$= K[\varphi_8 (\varphi_9 + \varphi_{14}) \sin(X_{9+14} - X_8)]$$

Since coils 13 and 6 are on the same core, their effects add vectorially, which is the required condition and may be represented as in Fig. 3.

The result then is that the circuits interact to produce torques which add together to produce a torque of the same magnitude as would be produced in an ideal meter and this relation is maintained independent of the frequency, in so far as the phase of the flux produced by the potential coils is independent of frequency, a condition which is approximately true.

The foregoing analysis is based on the assumption that the electromotive forces are balanced. This is a condition which is always met for the particular purposes which have been discussed and which is always sufficiently near the truth for all ordinary distribution systems.

I am aware that heretofore it has been proposed to utilize a plurality of current coils on the core of the meter elements, which current coils are energized from separate phases. None of them can be characterized as auxiliary current coils. I believe that the utilization of auxiliary conductively fed coils for phase compensation and for enabling the meter to register accurately under varying conditions of frequency is new.

While I have shown in the accompanying drawing the preferred embodiment of my invention, I do not wish to be limited thereto but aim to embrace in the appended claims all modifications falling fairly within the spirit and scope of my invention.

What I claim as new and desire to secure by Letters Patent of the United States, is:

1. In combination with a three phase alternating current circuit, a meter for measuring the power flowing therein comprising a pair of single phase induction watt-meter elements having current and potential coils connected to measure the power flowing in said circuit and an auxiliary current coil on each of said elements connected in series with the current coil of the other element for causing the measurements to be substantially independent of wide and continuous variations in the frequency of the circuit.

2. An electrical instrument of the induction type adapted to measure a quantity which is a function of the power expended in a circuit of varying frequency comprising a core having a plurality of limbs, a rotatable member affected by the fluxes set up in the core, a potential coil on one of said limbs, a main current coil on another limb, an auxiliary current coil located on the same limb as the main current coil, and means for energizing said auxiliary coil in such a way that the phase relation between the fluxes threading the potential coil and the current coil is maintained so that the instrument indicates substantially correctly and the phase relation is substantially independent of wide and continuous frequency variations.

3. In combination with a polyphase circuit, a polyphase electrical measuring instrument of the induction type adapted to measure a quantity which is a function of the power expended in such circuit, said meter comprising a core having a plurality of limbs, a rotatable element influenced by the fluxes set up in the core, a potential coil on one limb, a main current coil and an auxiliary current coil on another limb, said current coils being energized from different phases of the circuit and adapted to maintain the phase relation between the fluxes such that the instrument indicates substantially accurately, and to maintain the phase relation substantially independent of wide and continuous frequency variations.

In witness whereof, I have hereunto set my hand this 22nd day of July 1921.

WILLIAM H. PRATT.